United States Patent
Hwang et al.

(10) Patent No.: US 11,648,918 B2
(45) Date of Patent: May 16, 2023

(54) COMPENSATION CONTROL SYSTEM FOR PREVENTING BRAKING INCONVENIENCE OF FLEX BRAKE

(71) Applicants: Hyundai Motor Company, Seoul (KR); Kia Motors Corporation, Seoul (KR)

(72) Inventors: Se-Ra Hwang, Gyeonggi-do (KR); Gwan-Hyeong Cha, Seoul (KR); Gab-Bae Jeon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 388 days.

(21) Appl. No.: 16/903,924

(22) Filed: Jun. 17, 2020

(65) Prior Publication Data
US 2021/0179040 A1 Jun. 17, 2021

(30) Foreign Application Priority Data

Dec. 16, 2019 (KR) .......... 10-2019-0167657

(51) Int. Cl.
*B60T 8/17* (2006.01)
*B60T 17/22* (2006.01)
*B60T 13/66* (2006.01)

(52) U.S. Cl.
CPC .............. *B60T 8/17* (2013.01); *B60T 13/662* (2013.01); *B60T 17/221* (2013.01); *B60T 2270/402* (2013.01); *B60T 2270/413* (2013.01)

(58) Field of Classification Search
CPC ........ B60T 8/17; B60T 13/662; B60T 17/221; B60T 2270/402; B60T 2270/413
See application file for complete search history.

(56) References Cited

U.S. PATENT DOCUMENTS

2014/0083088 A1* 3/2014 Gonzalez Romero .. B60T 17/22
60/431

FOREIGN PATENT DOCUMENTS

KR    2018-0094590 A    8/2018

OTHER PUBLICATIONS

English Translation of KR 20150083271 A Author: Yun Han Woo Title: An Electric Booster Tunning System Using Navigation Date: Jul. 17, 2015 (Year: 2015).*
English Translation of JP 3716484 B2 Author: Yonemura et al. Title: Brake Device for Vehicle Date: Nov. 16, 2005 (Year: 2005).*

* cited by examiner

*Primary Examiner* — James J Lee
*Assistant Examiner* — Steven Vu Nguyen
(74) *Attorney, Agent, or Firm* — Fox Rothschild LLP (57) ABSTRACT

A compensation control system is provided for preventing braking inconvenience of a flex brake that compensates for brake hydraulic pressure only for initial braking when a brake mode is forcibly switched, thus allowing a driver to recognize a change in braking force, and thereby improving stability when a vehicle is driven. The control system forcibly switches the brake mode, selected by a driver when a booster system fails, into a normal brake mode, and compensates to reduce the magnitude of brake hydraulic pressure, which is to be reduced when the brake mode is forcibly switched, during initial braking.

13 Claims, 4 Drawing Sheets

FIG. 5

COMPENSATION CONTROL SYSTEM FOR PREVENTING BRAKING INCONVENIENCE OF FLEX BRAKE

CROSS-REFERENCE TO RELATED APPLICATION

This application claims under 35 U.S.C. § 119(a) the benefit of Korean Patent Application No. 10-2019-0167657, filed on Dec. 16, 2019, the entire contents of which are incorporated herein by reference.

BACKGROUND

(a) Technical Field

The present disclosure relates to a compensation control system for preventing braking inconvenience of a flex brake, and more particularly, the to a compensation control system for preventing braking inconvenience of a flex brake that compensates for brake hydraulic pressure for initial braking when a brake mode is forcibly switched, thus allowing a driver to recognize a change in braking force, and thereby improving stability when a vehicle is driven.

(b) Background Art

Generally, a brake booster is a device for boosting a pedal effort when a driver engages a brake pedal to brake a vehicle. The brake booster may be typically classified into a vacuum booster, a hydraulic booster, and an electric booster.

Among them, a brake device using the electric booster drives a motor according to a value of a pedal stroke sensor, which is information regarding a driver's pedal engagement or effort, thus generating brake pressure for front and rear wheels and implementing cooperative control between the front wheel and the rear wheel. In other words, the brake device using the electric booster drives the motor of the electric booster based on a required braking force calculated by an Electronic Control Unit (ECU) in response to the driver engaging the pedal, and generates the brake pressure for the front and rear wheels by the rotation of the motor.

To control the brake pressure of the electric booster, a develop technique provides a method of controlling the starting point of the motor of the electric booster to generate accurate brake pressure. This controls to generate original brake hydraulic pressure according to a brake specification.

Meanwhile, a flex brake is being developed which is configured to flexibly generate a braking force from a low braking force to a high braking force depending on the pedaling amount of the brake pedal, thus allowing thus increasing convenience. The flex brake provides a driver a choice for the brake mode. When engaging the pedal with the same pedal stroke magnitude, high brake hydraulic pressure is generated in a high brake mode and low brake hydraulic pressure is generated in a low brake mode, thus giving a driver different braking feelings. The flex brake may be generally applied to an electric or hydraulic booster. The flex brake needs to be operated in preparation for the error of the booster system, but the related art does not solve this problem.

SUMMARY

The present disclosure stops the function of a flex brake to secure the stability of a brake system in the event of the failure of a booster system, and then forcibly switches a mode into a normal brake mode. If the mode is forcibly switched into the normal brake mode when a driver selects a high brake mode or a low brake mode, a driver feels braking inconvenience. Therefore, the present disclosure provides technology for compensating for the braking inconvenience, which is felt by the driver when the brake mode is forcibly switched, only for initial braking.

According to one aspect of the disclosure, the present disclosure provides a compensation control system for preventing braking inconvenience of a flex brake, that may include: a brake-mode selection unit configured to select any one of a low brake mode, a normal brake mode, and a high brake mode divided according to a magnitude of brake hydraulic pressure; a memory configured to store a brake map showing a relationship between a magnitude of a pedal stroke and the magnitude of the brake hydraulic pressure for each brake mode; and a booster including an actuator configured to generate the brake hydraulic pressure and a controller configured to operate the actuator.

In particular, the controller may be configured to perform a braking operation based on the brake map stored in the memory unit according to selection of the brake-mode selection unit, determine a degree of performance degradation of the booster or presence or absence of an error of a signal controlling the booster, forcibly switch the high brake mode selected in the brake-mode selection unit into the normal brake mode on the basis of a determined result, and perform a compensation control for preventing the braking-inconvenience to reduce the magnitude of the brake hydraulic pressure reduced during forcible switching in an initial braking stage.

According to the present disclosure, when a brake mode is forcibly switched, the magnitude of brake hydraulic pressure during initial braking that is not recognized by a driver may be compensated, thus reducing braking inconvenience, and preventing a vehicle from colliding with an external object due to a lack of braking force. Furthermore, the present disclosure causes a driver to recognize a change in brake mode during initial braking, thus notifying the driver during additional braking, and increasing the driving stability of a vehicle.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of a compensation control system for preventing braking inconvenience of a flex brake in accordance with the present disclosure will be described in detail with reference to the attached drawings. Further, the terminologies or words used in the description and claims of the disclosure should not be interpreted as being limited merely to common or dictionary meanings. On the contrary, they should be interpreted based on the meanings and concepts of the disclosure in keeping with the scope of the disclosure on the basis of the principle that the inventor(s) can appropriately define the concepts of terms so as to describe the disclosure in the best way.

A compensation control system for preventing braking inconvenience of a flex brake in accordance with an exemplary embodiment of the present disclosure stops the function of the flex brake in the event of the failure of a booster system, and then forcibly switches a mode into a normal brake mode. In particular, the flex brake is designed to select various braking feelings during braking, and may include a low brake mode in which low-speed brake hydraulic pressure is generated, a normal brake mode in which medium-speed brake hydraulic pressure is generated, and a high brake mode in which high-speed brake hydraulic pressure is generated. A braking operation may thus be performed according to the selected brake mode. The compensation control system for preventing the braking inconvenience of the flex brake in accordance with an exemplary embodiment of the present disclosure compensates for the braking inconvenience, which is felt by a driver when the brake mode is forcibly switched, only for initial braking.

Figure 1:
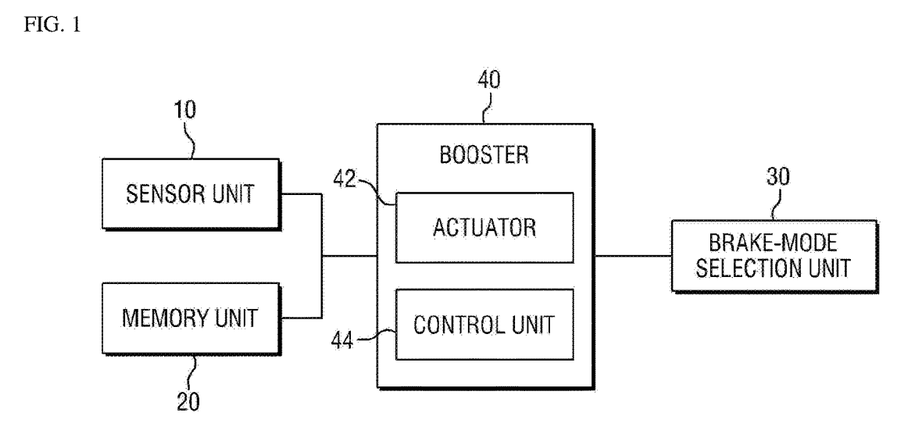
FIG. 1 is a diagram schematically illustrating the configuration of a compensation control system for preventing braking inconvenience of a flex brake in accordance with an exemplary embodiment of the present disclosure.

FIG. 1 is a diagram schematically illustrating the configuration of a compensation control system for preventing braking inconvenience of a flex brake in accordance with an exemplary embodiment of the present disclosure. Referring to FIG. 1, the compensation control system for preventing the braking inconvenience of the flex brake in accordance with the exemplary embodiment of the present disclosure may include a sensor unit 10, a memory unit 20, a brake-mode selection unit 30, and a booster 40.

The sensor unit 10 may be configured to measure information regarding the interior and exterior of the vehicle in real time. For example, a pedal stroke sensor included in the sensor unit 10 may be configured to measure pedal-effort information based on a driver's pedaling strength in real time (e.g., amount of force exerted onto the pedal), and a booster sensor may be configured to measure information regarding braking-operating hydraulic pressure generated in the booster 40 in real time. In addition, the sensor unit 10 may include various sensors configured to detect the state of the booster 40. The memory unit 20 may be configured to previously set and store (e.g., in advance) a brake map that corresponds to each brake mode. In other words, the brake map stored in the memory unit 20 may include a brake map of the low brake mode, a brake map of the normal brake mode, and a brake map of the high brake mode.

The brake map may define the generation pattern of the brake hydraulic pressure, and may be shown in a graph or the like. In an exemplary embodiment of the present disclosure, an x-axis representing the magnitude of the pedal stroke and a y-axis representing the magnitude of the brake hydraulic pressure are shown in the brake map, and a brake line connecting brake hydraulic pressure values based on the magnitude of the pedal stroke is shown. Therefore, the brake line of the low brake mode is shown in the brake map of the low brake mode, the brake line of the normal brake mode is shown in the brake map of the normal brake mode, and the brake line of the high brake mode is shown in the brake map of the high brake mode. In particular, the brake map of the normal brake mode may be set as the normal brake map. Herein, for the convenience of description, each brake line is shown in one brake map.

Meanwhile, the x-axis shown in the brake map may represent the amount of the pedal stroke. For example, when a driver does not press or engage the pedal, this may be expressed as the pedal stroke of 0%. When the pedal is completely pressed or engaged, this may be expressed as the pedal stroke of 100%.

In the brake-mode selection unit 30, the driver may select the brake mode. The brake-mode selection unit 30 may have various configurations such as an Audio Video Navigation (AVN), a separate touch-type display screen, a switch, or a dial, may be installed in the vehicle, and may be operated in conjunction with other terminals such as a smart phone. The brake-mode selection unit 30 may be connected to the controller 44, and thus, a signal selected in the brake-mode selection unit 30 may be applied to the controller 44, or a control signal of the controller 44 may be applied to the brake-mode selection unit 30.

The brake-mode selection unit 30 may be configured to directly display each brake mode to allow a driver to directly select the low brake mode, the normal brake mode, or the high brake mode. Meanwhile, according to another exemplary embodiment of the present disclosure, the brake mode may be preset in connection with the driving mode of the vehicle. For example, a comfort driving mode is connected with the normal brake mode, or a sport driving mode is connected with the high brake mode. In particular, if the driver selects the driving mode displayed on the brake-mode selection unit 30, the associated brake mode may be automatically set. Furthermore, according to another exemplary embodiment of the present disclosure, the brake map for each brake mode may be displayed on the brake-mode selection unit 30.

The booster 40 may include an actuator 42 and the controller 44 configured to operate the actuator 42. The booster 40 may be an electric booster of an Integrity Electronic Brake (IEB) or a hydraulic booster. The booster 40 according to an exemplary embodiment of the present disclosure may be configured to boost a braking force with brake hydraulic pressure generated by operating a master cylinder as well as a driver's force pressing or engaging the brake pedal. The booster 40 according to an exemplary embodiment of the present disclosure is an electric booster configured to generate the brake pressure by driving the motor. However, according to another exemplary embodiment of the present disclosure, the booster 40 may use various types of boosters, such as a hydraulic booster or a vacuum booster, depending on an operating method.

The actuator 42 may be configured to generate the brake pressure in response to a signal of the controller 44 to transmit the brake pressure to each wheel. The controller 44 may be configured to perform a general control operation related to braking. The controller 44 may be connected to the brake-mode selection unit 30 to provide information regarding the low brake mode, the normal brake mode, and the high brake mode to the brake-mode selection unit 30. If the brake mode is selected in the brake-mode selection unit 30, the controller 44 may be configured to access the brake map corresponding to the selected brake mode from the memory unit 20 and then perform a braking operation. Meanwhile, the controller 44 may be configured to perform the braking operation with the normal brake map, in response to determining that the brake mode may not be selected from the brake-mode selection unit 30 due to the failure of the brake-mode selection unit 30 or the like.

The controller 44 may be configured to receive information regarding the driver's pedal effort collected from the pedal stroke sensor in real time and then calculate a required braking force. The controller 44 may be configured to generate the brake hydraulic pressure by the brake map of the brake mode according to the calculated required braking force. The controller 44 may be configured to determine whether the booster system fails due to the failure of the actuator 42 or the controller 44.

Further, the controller 44 may be configured to determine the degree of the performance degradation of the booster 40. In other words, the controller 44 may be configured to determine that the booster 40 is in normal state. In particular, if the booster is not in normal state, the controller 44 may be configured to determine how much the performance of the booster 40 has degraded. The performance of the booster 40 according to an exemplary embodiment of the present disclosure may include first performance and second performance. The first performance is performance in the state where the booster 40 is operable in the normal brake mode, and the second performance is decreased compared to the first performance. The second performance is performance in a state where the booster 40 is unable to be operated in the normal brake mode. In particular, the level of the second performance may be variously set according to the specification of the booster 40 and other brakes.

In response to determining that the booster 40 has the first performance, the controller 44 may be configured to forcibly switch the mode into the normal brake mode, regardless of the brake mode selected in the brake-mode selection unit 30. At this time, if the brake mode selected in the brake-mode selection unit 30 is the high brake mode, the braking force is decreased due to a reduction in brake hydraulic pressure, and thus, a driver experiences a pushing feeling during braking. If the brake mode selected in the brake-mode selection unit 30 is the low brake mode, the braking force is increased due to an increase in brake hydraulic pressure, and thus, a driver experiences a sticking feeling during braking. Particularly, if the mode is switched from the high brake mode into the normal brake mode, a reduced braking force may lead to safety problems in urgent braking situations. Therefore, the controller 44 according to the exemplary embodiment of the present disclosure may be configured to perform the compensation control for preventing the braking inconvenience to compensate for the braking inconvenience. This will be described below.

In response to determining that the booster 40 has the second performance, the controller 44 may be configured to generate the brake hydraulic pressure according to the second performance without switching the mode into the normal brake mode. At this time, the controller 44 may be configured to output an alarm message to a driver indicating that the performance of the booster 40 is in the second performance and the brake hydraulic pressure is generated according to the second performance.

The state of the booster 40 that is degraded compared to the second performance is a dangerous state in which the braking force is generated insufficiently. Therefore, in response to determining that the booster 40 is degraded compared to the second performance, the controller 44 may be configured to perform backup braking. In particular, the backup braking is braking that generates the brake hydraulic pressure compared to degradation in the performance of the booster 40. The backup braking may be performed through a backup path connected to the master cylinder.

The controller 44 may be configured to determine whether there is an error in the signal for operating the booster 40. Particularly, the presence of the error refers to a situation in which the control signal transmitted from the controller 44 is not applied to the booster 40 according to the information measured in the sensor unit 10 in real time. If such a situation occurs, the controller 44 may be configured to forcibly switch the mode into the normal brake mode regardless of the brake mode selected in the brake-mode selection unit 30. In particular, the controller 44 may be configured to perform the compensation control for preventing the braking inconvenience in response to the signal of the brake mode selected in the brake-mode selection unit 30. Furthermore, the controller 44 may be configured to output the alarm message to the driver indicating that the control signal has an error.

Meanwhile, the controller 44 may be configured to transmit and receive the control signal in conjunction with other braking add-on devices such as an Anti-lock Brake System (ABS), an Electronic Stability Control (ESC), or a Traction Control System (TCS). The function of the controller 44 determining the degree of the performance degradation of the booster 40 or determining whether there is an error in the control signal of the booster 40 may prepare for a situation in which the above-described braking add-on device is unable to be operated.

The controller 44 may be configured to perform the compensation control for preventing the braking inconvenience. As described above, if the performance of the booster 40 is the first performance or the signal for controlling the booster 40 has an error, the mode may be forcibly switched into the normal brake mode. The compensation control for preventing the braking inconvenience may compensate for the braking inconvenience caused by the switching of the brake mode, when the brake mode selected in the brake-mode selection unit 30 is either the low brake mode or the high brake mode.

However, the compensation control for preventing the braking inconvenience according to the exemplary embodiment of the present disclosure will be described with reference to a case where the mode is switched from the high brake mode to the normal brake mode to ensure a driver's safety. Meanwhile, if the brake mode selected in the brake-mode selection unit 30 is the normal brake mode, the compensation control for preventing the braking inconvenience is not performed, and the controller 44 may be configured to perform an operation in the normal brake mode.

The compensation control for preventing the braking inconvenience in accordance with an exemplary embodiment of the present disclosure may include any one of first to third compensation controls for preventing the braking inconvenience. The first to third compensation controls for preventing the braking inconvenience may be performed by the brake map of the compensation brake mode having the brake hydraulic pressure that is less than the magnitude of the brake hydraulic pressure in the high brake mode and is greater than the magnitude of the brake hydraulic pressure in the normal brake mode. The brake line of the compensation brake mode is shown in the brake map of the compensation brake mode.

The brake map of the compensation brake mode is preset and stored in the memory unit 20. Particularly, when switching from the high brake mode into the normal brake mode, the brake hydraulic pressure may be reduced in all sections (e.g., sections corresponding to the magnitude of the pedal stroke). The compensation control for preventing the braking inconvenience compensates for a reduction in the magnitude of the reduced brake hydraulic pressure by switching the high brake mode into the compensation brake mode. In particular, there are many methods of determining a compensation amount. According to these methods, the compensation control is divided into the first to third compensation controls for preventing the braking inconvenience.

Figure 2:
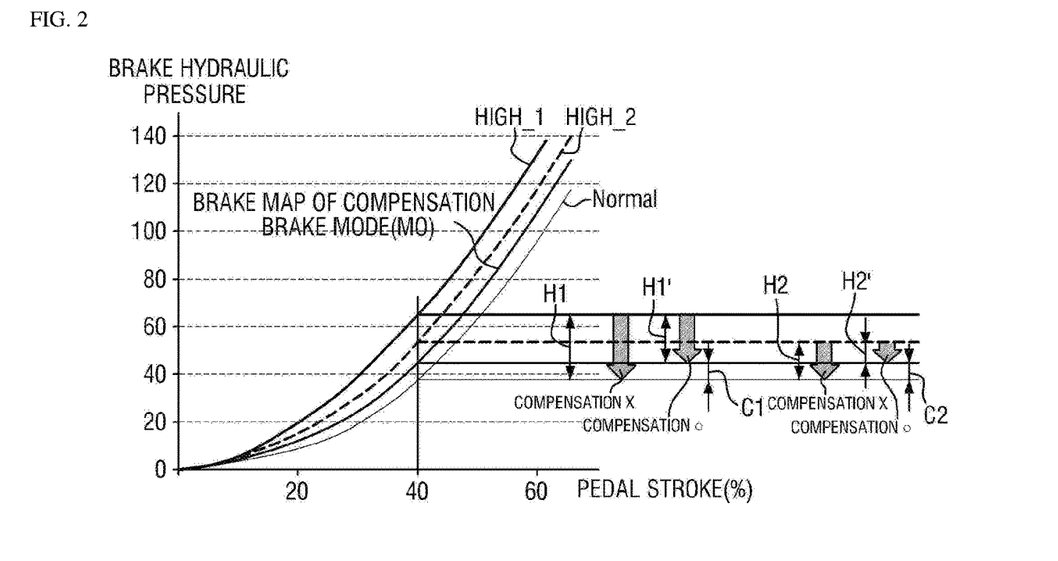
FIG. 2 is a graph illustrating a first compensation control for preventing braking inconvenience in accordance with an exemplary embodiment of the present disclosure.

FIG. 2 is a graph illustrating the first compensation control for preventing braking inconvenience in accordance with an exemplary embodiment of the present disclosure.

Referring to FIG. 2, in a first case, the mode may be forcibly switched from the first high brake mode into the normal brake mode and in a second case, the mode may be forcibly switched from the second high brake mode having the brake hydraulic pressure less than that of the first high brake mode into the normal brake mode. The first compensation control for preventing braking inconvenience is a control method of making the compensation amount in all the sections equal.

Particularly, as shown in FIG. 2, the first compensation control for preventing braking inconvenience at a point where the magnitude of the pedal stroke is 40% will be described below. When switching from the first high brake mode into the normal brake mode, the magnitude of the reduced brake hydraulic pressure is H1, the amount compensated by the brake map M of the compensation brake mode is C1, and the magnitude of the brake hydraulic pressure after the compensation is H1'. Furthermore, when switching from the second high brake mode into the normal brake mode, the magnitude of the reduced brake hydraulic pressure is H2, the amount compensated by the brake map M0 of the compensation brake mode is C2, and the magnitude of the brake hydraulic pressure after the compensation is H2'. The magnitude of C1 is equal to that of C2. The first compensation control for preventing braking inconvenience may be performed by the brake map M0 of one compensation brake mode.

According to the first compensation control for preventing braking inconvenience, the magnitude H1' of the brake hydraulic pressure after the compensation in the first case is greater than the magnitude H2' of the brake hydraulic pressure after the compensation in the second case. Therefore, a driver may feel that the second case has greater compensation effect.

Figure 3:
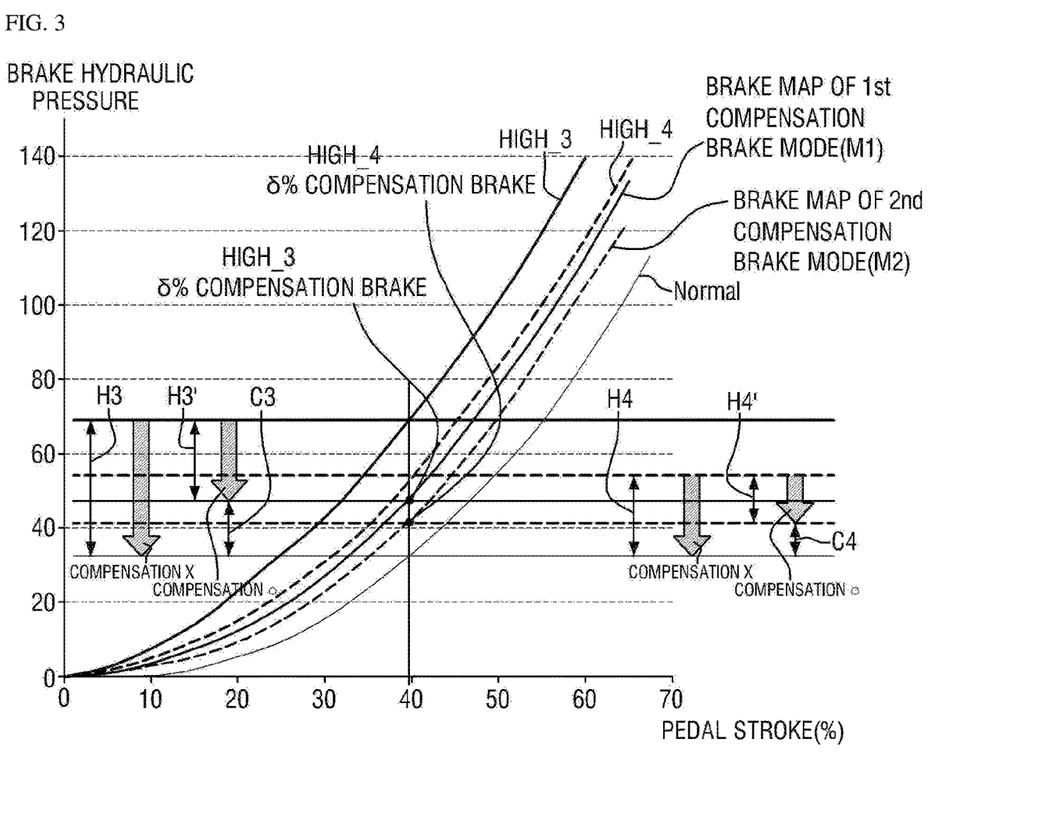
FIG. 3 is a graph illustrating a second compensation control for preventing braking inconvenience in accordance with an exemplary embodiment of the present disclosure.

FIG. 3 is a graph illustrating the second compensation control for preventing braking inconvenience in accordance with an exemplary embodiment of the present disclosure. Referring to FIG. 3, a third case is provided in which the mode may be forcibly switched from the third high brake mode into the normal brake mode and a fourth case in which the mode may be forcibly switched from the fourth high brake mode having the brake hydraulic pressure less than that of the third high brake mode into the normal brake mode. The second compensation control for preventing braking inconvenience is a method of controlling the compensation amount so that a compensation ratio is constant in all the sections.

Particularly, as shown in FIG. 3, according to the exemplary embodiment of the present disclosure, the second compensation control for preventing braking inconvenience at a point where the magnitude of the pedal stroke is 40% will be described below. When switching from the third high brake mode into the normal brake mode, the magnitude of the reduced brake hydraulic pressure is H3, the amount compensated by the brake map M of the first compensation brake mode is C3 considering a compensation ratio $\delta$ for H3, and the magnitude of the brake hydraulic pressure after the compensation is H3'.

Furthermore, when switching from the fourth high brake mode into the normal brake mode, the magnitude of the reduced brake hydraulic pressure is H4, the amount compensated by the brake map M2 of the second compensation brake mode is C4 considering a compensation ratio $\delta$ for H4, and the magnitude of the brake hydraulic pressure after the compensation is H4'. In particular, the magnitude of C3 is different from that of C4, but the compensation ratio $\delta$ is equal. In the exemplary embodiment of the present disclosure, $\delta$ is a value ranging from 0 to 1, and may be expressed as a percentage. The second compensation control for preventing braking inconvenience may be performed by the brake map M1 of the first compensation brake mode and the brake map M2 of the second compensation brake mode applied to the fourth high brake mode.

According to the second compensation control for preventing braking inconvenience, the compensation ratio $\delta$ of the third case is equal to that of the fourth case. Therefore, a driver may feel the same compensation effect even if the mode is switched from the third high brake mode into the normal brake mode or from the fourth high brake mode into the normal brake mode.

Figure 4:
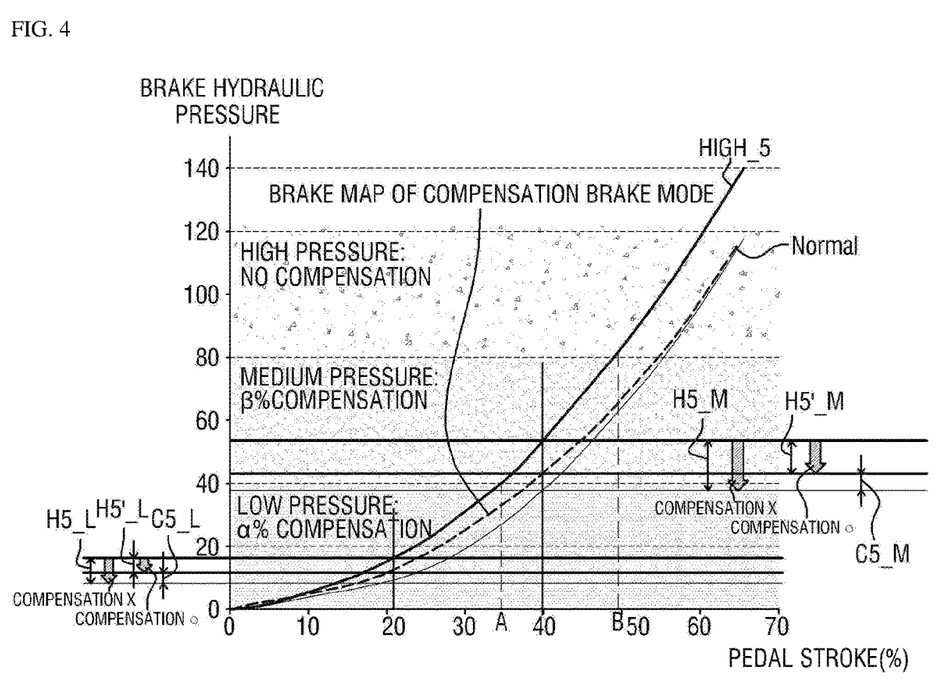
FIG. 4 is a graph illustrating a third compensation control for preventing braking inconvenience in accordance with an exemplary embodiment of the present disclosure.

FIG. 4 is a graph illustrating the third compensation control for preventing braking inconvenience in accordance with an exemplary embodiment of the present disclosure.

Referring to FIG. 4, the third compensation control for preventing braking inconvenience is a control method in which each of a low-pressure section, a medium-pressure section, and a high-pressure section divided based on the magnitude of the brake hydraulic pressure has a different compensation ratio. In this regard, the low-pressure section is a section up to point A based on the magnitude of the pedal stroke, the medium-pressure section is a section from point A to point B, and the high-pressure section is a section after point B. Notably, points A and B for dividing the section into the low-pressure section and the high-pressure section may vary depending on the brake map.

As shown in FIG. 4, a fifth case is provided in which the mode may be forcibly switched from the fifth high brake mode into the normal brake mode in the low-pressure section and a sixth case in which the mode may be forcibly switched from the fifth high brake mode into the normal brake mode in the medium-pressure section.

The third compensation control for preventing braking inconvenience will be described as follows. According to an exemplary embodiment of the present disclosure, when the mode is switched from the fifth high brake mode into the normal brake mode at a point in the low-pressure section where the magnitude of the pedal stroke is 20%, the magnitude of the reduced brake hydraulic pressure is H5_L, and the amount compensated by the brake map M3 of the compensation brake mode is C5_L considering a compensation ratio $\alpha$ for H5_L, and the magnitude of the brake hydraulic pressure after the compensation is H5'_L.

Moreover, according to the exemplary embodiment of the present disclosure, when the mode is switched from the fifth high brake mode into the normal brake mode at a point in the medium-pressure section where the magnitude of the pedal stroke is 40%, the magnitude of the reduced brake hydraulic pressure is H5_M, and the amount compensated by the brake map M3 of the compensation brake mode is C5_M considering a compensation ratio $\beta$ for H5_M, and the magnitude of the brake hydraulic pressure after the compensation is H5'_M. In this regard, the compensation ratio $\alpha$ is different from the compensation ratio $\beta$. According to an exemplary embodiment of the present disclosure, a is greater than $\beta$. Particularly, a and 13 are values ranging from 0 to 1, and may be expressed as a percentage. The third compensation control for preventing braking inconvenience may be performed by the brake map M3 of the compensation brake mode.

Furthermore, according to the exemplary embodiment of the present disclosure, the third compensation control for preventing braking inconvenience is not performed in the high-pressure section. Referring to FIG. 4, in the high-pressure section, the brake line shown in the brake map M3 of the compensation brake mode approaches the brake line shown in the brake map of the normal brake mode.

If a driver slowly presses or engages the pedal (e.g., the magnitude of the pedal stroke increases) in the event of a braking situation, the pedal starts from the low-pressure section (e.g., fifth case), passes through the medium-pressure section (e.g., sixth case), and then reaches the high-pressure section. In particular, according to the third compensation control for preventing braking inconvenience, the braking inconvenience may be transmitted to inform a driver that the brake hydraulic pressure is reduced in the initial braking stage that is the low-pressure section, and control may be performed to increase the compensation amount for improved safety. Subsequently, control may be performed to decrease the compensation ratio of the medium-pressure section to be less than that of the low-pressure section to reduce the compensation amount, and there is no compensation amount in the high-pressure section. Since a driver recognizes that the brake hydraulic pressure is already reduced in the initial braking stage by the control, the pedal may be engaged or pressed to further generate the brake hydraulic pressure in the medium-pressure section or the high-pressure section.

Meanwhile, according to the exemplary embodiment of the present disclosure, the first to third compensation controls for preventing the braking inconvenience may be performed only once at the beginning of the initial braking. After the compensation control for preventing the braking inconvenience is performed, the braking may be performed subsequently by the brake map of the normal brake mode, since a driver recognizes that the brake hydraulic pressure is already reduced and the brake mode is switched. Meanwhile, various types of signals are transmitted via a communication network in the vehicle. In particular, the communication network may include a Controller Area Network (CAN), a Local Interconnect Network (LIN), a FlexRay, a Media Oriented System Transport (MOST), etc.

Figure 5:
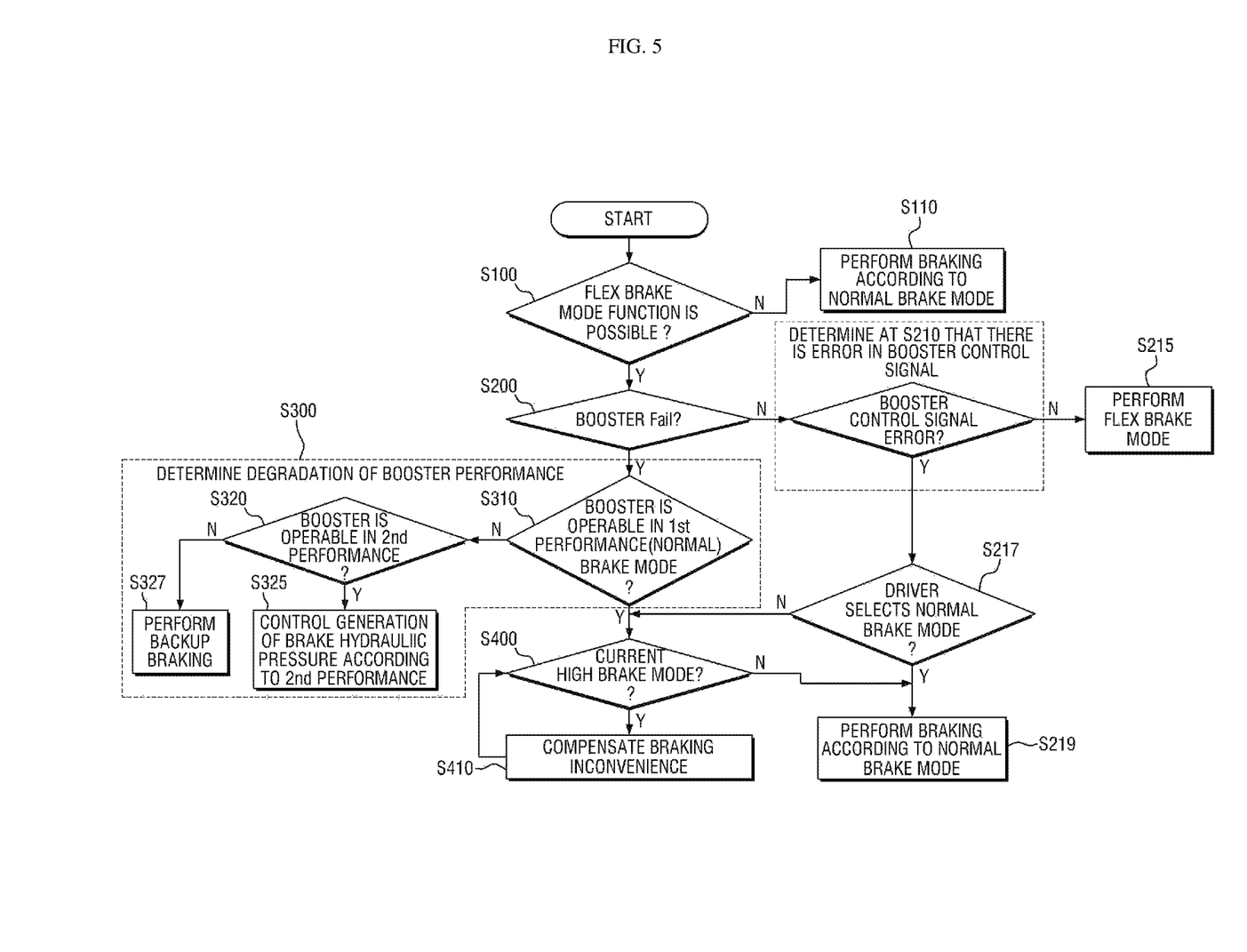
FIG. 5 is a flowchart illustrating the operation of a compensation control system for preventing braking inconvenience of a flex brake in accordance with an exemplary embodiment of the present disclosure.

FIG. 5 is a flowchart illustrating the operation of a compensation control system for preventing braking inconvenience of a flex brake in accordance with an exemplary embodiment of the present disclosure. Referring to FIG. 5, first, the controller 44 may be configured to determine whether the flex brake function is normal at step S100. In response to determining that the flex brake function is not normal, the controller 44 may be configured to perform a braking operation according to the normal brake mode at step S105.

Further, in response to determining that the flex brake function is normal, the controller 44 may be configured to determine whether the booster 40 is normal at step S200. In response to the controller 44 determining that the performance of the booster 40 is normal, the controller 44 may be configured to whether there is an error in the signal controlling the booster 40 at step S210. When no error is detected in the signal controlling the booster 40, control may be performed to perform the flex brake based on the brake mode selected in the brake-mode selection unit 30 at step S215. When the error in the signal controlling the booster 40 is detected, the controller 44 may be configured to switch the mode into the normal brake mode.

At this time, if the brake mode selected in the brake-mode selection unit 30 is the normal brake mode, the mode matches a preset mode at step S217. Thus, the controller 44 may be configured to perform the braking operation based on the normal brake mode at step S219. If the brake mode selected in the brake-mode selection unit 30 is the high brake mode at step S400, the compensation control for preventing the braking inconvenience may be performed at step S410. Since the mode is not the high brake mode any more after the compensation control for preventing the braking inconvenience is performed, the controller 44 may be configured to perform the braking operation based on the normal brake mode at step S219.

Subsequently, in response to determining that the booster 40 is not normal (e.g., failure, degradation, etc.), the controller 44 may be configured to determine the degree of the performance degradation of the booster 40 at step S300. First, whether the booster 40 is operable in the first performance (e.g., performance beyond the normal brake mode) may be determined at step S310. If the booster 40 is operable in the first performance, the controller 44 may be configured to switch the mode into the normal brake mode. Particularly, if the brake mode selected in the brake-mode selection unit 30 is the high brake mode at step S400, the compensation control for preventing the braking inconvenience may be performed at step S410. Since the mode is not the high brake mode any more after the compensation control for preventing the braking inconvenience is performed, the controller 44 may be configured to perform the braking operation based on the normal brake mode at step S219. Meanwhile, if the brake mode selected in the brake-mode selection unit 30 is the normal brake mode, the compensation control for preventing the braking inconvenience is not performed.

Subsequently, if the booster 40 is not operable in the first performance, the controller 44 may be configured to determine whether the booster is operable in the second performance at step S320. When the booster 40 is operable in the second performance, the controller 44 may be configured to generate the brake hydraulic pressure based on the second performance at step S325. If the booster 40 is not operable in the second performance, the backup braking may be performed at step S327.

According to the present disclosure, if the mode is switched into the brake mode different from the brake mode selected by a driver, especially if the mode is switched from the high brake mode into the normal brake mode, the magnitude of brake hydraulic pressure during initial braking that is not recognized by the driver is compensated, thus reducing braking inconvenience, and preventing a vehicle from colliding with an external object due to a lack of braking force. Furthermore, the present disclosure helps a driver to recognize a change in brake mode during initial braking, thus calling the driver's attention during additional braking, and increasing the driving stability of a vehicle.

Although the present disclosure was described with reference to exemplary embodiments shown in the drawings, it is apparent to those skilled in the art that the present disclosure may be changed and modified in various ways without departing from the scope of the present disclosure.

What is claimed is:

1. A compensation control system for preventing braking inconvenience of a flex brake, comprising:
    a brake-mode selection unit including a processor configured to select any one from a group consisting of: a low brake mode, a normal brake mode, and a high brake mode divided according to a magnitude of brake hydraulic pressure;
    a memory configured to store a brake map showing a relationship between a magnitude of a pedal stroke and the magnitude of the brake hydraulic pressure for each brake mode; and
    a booster including an actuator configured to generate the brake hydraulic pressure and a controller including a processor configured to operate the actuator,
    wherein the controller is configured to:
        perform a braking operation based on the brake map stored in the memory according to the selection of the brake-mode selection unit;
        determine a degree of performance degradation of the booster or a presence or an absence of an error of a signal controlling the booster;
        forcibly switch the high brake mode selected in the brake-mode selection unit into the normal brake mode in accordance with the degree of performance degradation of the booster or the presence of the error of the signal controlling the booster; and
        perform a compensation control for preventing the braking-inconvenience to reduce the magnitude of the brake hydraulic pressure reduced during forcible switching in an initial braking stage;
    wherein the compensation control for preventing the braking-inconvenience performs control for a low-pressure section and a high-pressure section that are divided based on the magnitude of the brake hydraulic pressure, and adjusts a compensation ratio of the magnitude of the brake hydraulic pressure reduced when switching from the high brake mode into the normal brake mode in the low-pressure section to be greater than a compensation ratio in a remaining section.

2. The compensation control system of claim 1, wherein the compensation control for preventing the braking-inconvenience is performed by a brake map of a compensation brake mode having the brake hydraulic pressure that is less than the magnitude of the brake hydraulic pressure in the high brake mode and is greater than the magnitude of the brake hydraulic pressure in the normal brake mode.

3. The compensation control system of claim 1, wherein the compensation control for preventing the braking-inconvenience performs control such that a compensation amount of the brake hydraulic pressure reduced when switching from a first high brake mode into the normal brake mode, and a compensation amount of the brake hydraulic pressure reduced when switching from a second high brake mode having brake hydraulic pressure less than that of the first high brake mode into the normal brake mode are constant based on the magnitude of the pedal stroke.

4. The compensation control system of claim 1, wherein the compensation control for preventing the braking-inconvenience includes maintaining a compensation ratio of the brake hydraulic pressure reduced when switching from a first high brake mode into the normal brake mode, and a compensation ratio of the brake hydraulic pressure reduced when switching from a second high brake mode having brake hydraulic pressure less than that of the first high brake mode into the normal brake mode constant based on the magnitude of the pedal stroke.

5. The compensation control system of claim 4, wherein the compensation control for preventing the braking-inconvenience is performed by a brake map of a first compensation brake mode that compensates for a magnitude of the brake hydraulic pressure reduced when switching from the first high brake mode into the normal brake mode, and a brake map of a second compensation brake mode that has brake hydraulic pressure less than that of the first compensation brake mode and compensates for a magnitude of the brake hydraulic pressure reduced when switching from the second high brake mode into the normal brake mode.

6. The compensation control system of claim 1, wherein the compensation control for preventing the braking-inconvenience is not performed in the high-pressure section.

7. The compensation control system of claim 1, wherein the controller is configured to perform the braking operation according to the brake map of the normal brake mode, in response to the normal brake mode being selected in the brake-mode selection unit and in response to determining that there is an error in the signal controlling the booster.

8. The compensation control system of claim 1, wherein the controller is configured to determine whether the booster, which is degraded in performance when the degree of the performance degradation of the booster is determined, is operable in first performance that is performance of the normal brake mode.

9. The compensation control system of claim 8, wherein the controller is configured to switch the mode into the normal brake mode in response to determining that the booster is operable in the first performance.

10. The compensation control system of claim 8, wherein the controller is configured to determine whether the booster is operable in second performance that is degraded as compared to the first performance, in response to determining that the booster is inoperable in the first performance.

11. The compensation control system of claim 10, wherein the controller is configured to operate the booster to generate brake hydraulic pressure according to the second performance in response to determining that the booster is operable in the second performance.

12. The compensation control system of claim 10, wherein the controller is configured to operate the booster to perform backup braking in response to determining that the booster is inoperable in the second performance.

13. The compensation control system of claim 1, wherein the controller is configured to perform the braking operation according to the brake map of the normal brake mode if there is no input signal in the brake-mode selection unit.

* * * * *